Sept. 15, 1953    J. D. HOFFMAN    2,652,216
AIRCRAFT STRUCTURE COOLING MEANS
Filed May 5, 1952    2 Sheets-Sheet 1

INVENTOR.
JAMES D. HOFFMAN
BY
William P. Lane
ATTORNEY

Sept. 15, 1953  J. D. HOFFMAN  2,652,216
AIRCRAFT STRUCTURE COOLING MEANS
Filed May 5, 1952  2 Sheets-Sheet 2

INVENTOR.
JAMES D. HOFFMAN
BY
William R. Lane
ATTORNEY

Patented Sept. 15, 1953

2,652,216

UNITED STATES PATENT OFFICE 2,652,216

AIRCRAFT STRUCTURE COOLING MEANS

James D. Hoffman, Pacific Palisades, Calif., assignor to North American Aviation, Inc.

Application May 5, 1952, Serial No. 286,108

5 Claims. (Cl. 244—74)

This invention pertains to an aircraft cooling means and more particularly to means for cooling a jet propulsion aircraft while on the ground.

For a modern jet propulsion aircraft it is necessary to provide means for cooling the aircraft structure around the engine so that the structure will not be damaged by the extreme heat produced by the engine. Normally there is provided a passage which conducts air from a forwardly disposed aperture around the engine and out through the rear portions of the aircraft. This works very satisfactorily when the plane is flying because the ram effect of the aircraft in flight will assure that an adequate quantity of cooling air flows between the engine and the aircraft structure to provide the necessary cooling. However, such an arrangement has not proved satisfactory when the aircraft is on the ground. There it may be necessary to operate the engine at high power, such as for takeoff, but the velocity of the aircraft will be zero or very slow which means that there is not such a ram effect as will provide adequate flow of cooling air. It was then proposed to design the exit from the fuselage so that the jet emitting from the nozzle of the engine would act as an aspirator and pull or pump air through the cooling passage around the engine. On original low nozzle pressure ratio engines this design operated satisfactorily from the standpoint of inducing a flow of cooling air through the passage, but with improved engines utilizing a wide range of nozzle pressure ratios it penalized the performance of the aircraft by requiring an inefficient nozzle design. It meant that in order to induce proper flow of cooling air while at maximum nozzle pressure ratio (high altitude, high speed) the aspirator had to be constructed quite large to prevent choking. As a result, it was very inefficient from a drag standpoint when the aircraft was in flight at low nozzle pressure ratio conditions.

It is therefore an object of this invention to provide a cooling means which will assure adequate ground cooling with a minimum of flight penalty.

Another object of this invention is to provide a means for inducing flow of cooling air by the compressor of the jet propulsion engine.

A further object of this invention is to provide aircraft cooling means that will be automatically operated with the airplane on the ground.

These and other objects will become apparent from the following detailed description taken in connection with the accompanying drawings in which Fig. 1 is a sectional view of a portion of an aircraft employing the cooling means of this invention;

Figure 1:
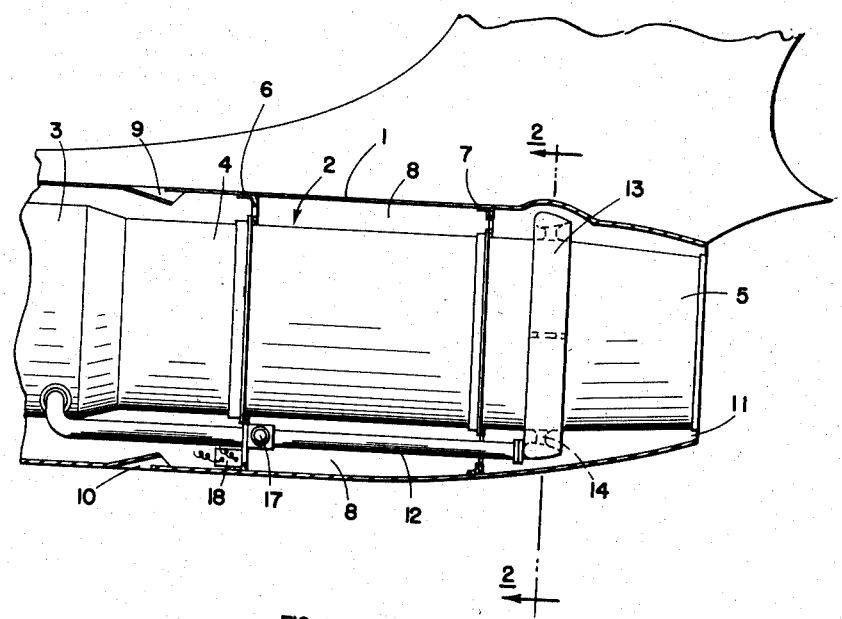

An aircraft may be provided with a body 1 in which a jet propulsion engine 2 is carried. Body 1 may comprise any suitable housing such as a nacelle or portions of the fuselage. As shown in Fig. 1, body 1 comprises the aft portion of the fuselage of the aircraft. Jet engine 2 is of a conventional type including a compressor 3, burner section 4, and tail pipe or tail pipe and afterburner 5. The engine is suspended within the fuselage by means of suitable brackets or other members 6 and 7 which are so arranged that an annular cooling air passageway 8 is provided between the engine and the interior of fuselage 1. Annular passage 8 provides a space for cooling air to flow around the engine for protecting the interior of the fuselage. Suitable openings 9 and 10 are included in the fuselage for allowing air to flow into passage 8, rearwardly around the burner and tail pipe sections of the engine, and out through exit 11 near the tail pipe exit. While the aircraft is in flight, ram air will be forced in through apertures 9 and 10 through passage 8 and out through exit 11. When the aircraft is at rest or traveling at slow speed insufficient air will be forced through these apertures and through the cooling air passage 8 to adequately cool the aircraft structure.

Figure 2:
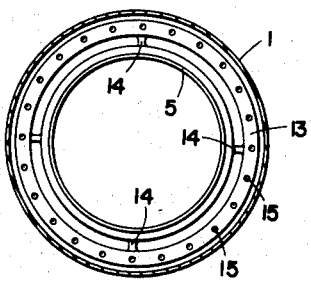
Fig. 2 is a sectional view, partly in elevation, taken along line 2—2 of Fig. 1.
Figure 3:
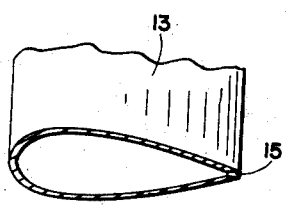
Fig. 3 is a fragmentary sectional view of the aspirator ring of Figs. 1 and 2.

According to the teachings of this invention, a conduit or pipe 12 is connected to the outlet of compressor 3 so as to receive a portion of the compressed air supplied by the compressor. Pipe 12 is connected at its terminus to an annular aspirator ring 13. This ring is suitably mounted in spaced relationship with the engine and the fuselage by means of suitable brackets 14. In one embodiment of this invention aspirator ring 13 is of streamlined cross-section as illustrated in Figs. 1 and 3 so as to provide a minimum resistance to cooling air flowing through passage 8. The rear or trailing edge of annular ring 13 is provided with a plurality of outlet apertures or orifices 15 as best seen in Figs. 2 and 3. There is thus provided a connection between the compressor outlet and annular ring 13 whereby compressed air may be conducted from the compressor to the annular ring and exhausted rearwardly within the cooling air passage through apertures 15. This provides a series of air jets from ring 13 exhausting at a relatively high speed through the small apertures 15. These air jets, by means of an aspirator effect, will induce airflow through passage 8. Air will be drawn through apertures 9 and 10 into passage 8 and out through aperture 11 in such a manner that the fuselage will be cooled and protected from the heat of the jet propulsion engine. It is preferable to locate the annular ring near the aft portions of the engine as illustrated to assure that airflow will be induced around the entire length of the engine.

Because the flow of air through the cooling air passage is not induced by the propulsive gases from the engine certain advantages can be realized. The engine nozzle exit can be brought aft approximately in line with the aft end of the fuselage, as shown in Fig. 1, and cooling air exit 11 can be made smaller than with conventional designs. As a result of these provisions the airplane will have more favorable drag characteristics.

Figure 4:
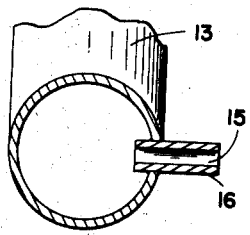
Fig. 4 is a fragmentary sectional view of a modification of the aspirator ring.

As a modification, annular ring 13 may be of round cross-section as shown in Fig. 4. Apertures 15 may be merely drilled into this ring or small lengths of tubing 16 may be suitably fastened in the aft portion of the aspirator ring to provide the apertures. Air thus exhausts from the ring through the plurality of short tubes 16 and into passage 8 at the rear of the annular ring. Of course, further modification of this annular ring is possible within the scope of this invention. The ring could be made of a different cross-section from that illustrated or for convenience it might be manufactured in more than one piece each of which might be separate and include its own air inlet from the compressor. Apertures 15 might comprise elongated slots of a design which would assure a high velocity jet exhausting therefrom when the unit is in operation.

It is of course undesirable that aspirator ring 13 be supplied with its maximum air flow from the compressor during flight of the aircraft even though the airflow therethrough need not be large. It is preferred to throttle the flow to a smaller value or completely shut it off when the aircraft is in flight. For this reason a valve 17 is included in pipe 12 and is operable to control the airflow from the compressor to the annular ring.

Figure 5:
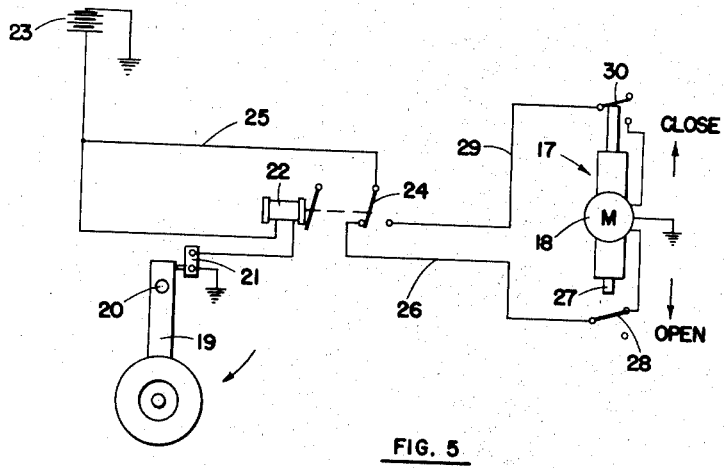
Fig. 5 is a schematic view of a wiring arrangement for automatically operating cooling means.

It is further desirable to have automatic operation of valve 17 so that there will always be airflow through the aspirator ring when it is needed and there will be no danger of overheating and damage to the aircraft structure. To accomplish this a motor or suitable actuator 18 is connected to the valve to effect its operation and the motor may be controlled in a manner illustrated in Fig. 5. The aircraft may include an ordinary retractable landing gear 19 suitably mounted in the aircraft. As shown in Fig. 5 landing gear 19 is pivotal about point 20 during its retraction and extension. A switch 21 is so mounted within the aircraft that it is closed by landing gear 19 as it is pivoted about point 20 to an extended or down position. As this occurs, current is conducted to relay 22 which is connected to a source of electrical energy such as battery 23 and is then shifted so that contact 24 connects wires 25 and 26. Electricity is then conducted through wire 25, contact 24 and wire 26 to reversible motor 18. As shown in Fig. 5 the connection has just been made between the source of electricity and the motor, but actuator of the motor has not yet begun its operation. As the motor subsequently operates actuator 27 will open valve 17 and will be extended to the position illustrated in Fig. 6. When the valve is completely open actuator 27 will engage limit switch 28 opening this switch and breaking contact between the motor and the battery. The valve is in this manner fully opened and air may flow from the compressor to the annular ring for inducing a flow of cooling air. When the landing gear is subsequently pivoted to a raised position, switch 21 will be opened and relay 22 will be de-energized. This means that contact 24 will assume a position where it interconnects wire 25 and wire 29 which conduct current to the motor for rotating it in the opposite direction. The motor then moves actuator 27 in the opposite direction which closes the valve and extends the actuator to the position shown in Fig. 5 which opens limit switch 30 upon completion of its travel, breaking contact between the motor and the source of electricity. Thus valve 17 is automatically closed when a landing gear is in up position as when the aircraft is in flight.

Figure 6:
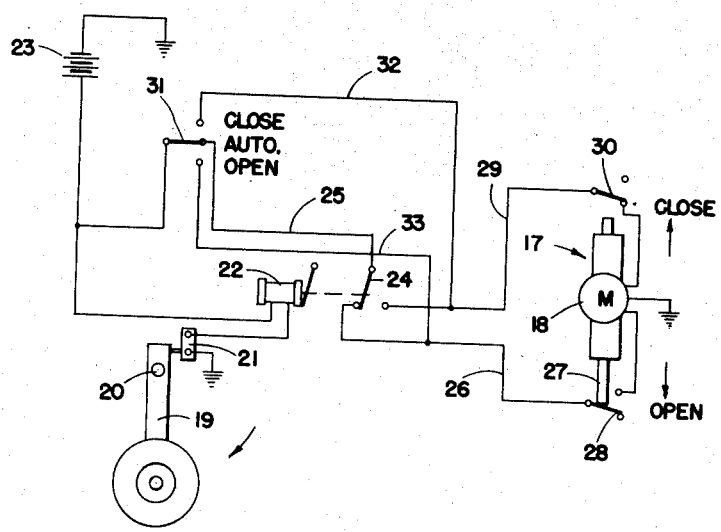
Fig. 6 is a schematic view of a modification of the wiring arrangement.

In the modification illustrated in Fig. 6 there is included a manual over-ride provision whereby motor 18 may be operated by a manually operated switch instead of automatically controlled, if it is so desired. For such an arrangement a switch 31 is provided which will interconnect wire 25 with the source of electricity in the manner shown in Fig. 5, or which may interconnect wire 32 or 33 with the source of electricity for closing or opening the valve respectively. In such cases the contact is broken with the automatic circuit so that manual operation of switch 31 will cause movement of the actuator.

Further modifications could be included within the scope of the invention such as by placing a switch on the shock strut of the landing gear in such a manner that weight upon the aircraft, as when resting on the ground, would energize relay 22 for automatically controlling valve 17. It is also considered possible to control the actuation of valve 17 by means of a switch sensitive to impact pressure, or a switch sensitive to the temperature of portions of the aircraft structure.

It is to be clearly understood that the foregoing detailed description is given by way of illustration only and is not to be taken by way of limitation, the spirit and scope of this invention being limited only by the appended claims.

I claim:

1. Cooling means for an aircraft having a jet propulsion engine having an air compressor and a body, said engine being disposed within said body so as to provide an annular passage around said engine having a forward inlet and a rear outlet, said means comprising an annular hollow member disposed within said passage in spaced relationship with said engine and said body, said member being provided with a plurality of apertures in the rear portion thereof; means interconnecting said air compressor and said annular member whereby air flows into said member and is discharged therefrom through said apertures thereby inducing a flow of air through said passage for cooling said body.

2. A device as recited in claim 1 in which said aircraft is provided with a landing gear and including in addition a normally closed valve interposed between said air compressor and said annular member for controlling the admission of compressed air to said annular member, and means interconnecting said valve and the landing gear of said aircraft for automatically opening said valve upon the lowering of said landing gear.

3. A device as recited in claim 1 in which said annular member is of streamlined cross section tapering toward the trailing edge thereof and in which said orifices are disposed in the trailing edge thereof.

4. A device for cooling an aircraft having a body and a jet propulsion engine provided with a compressor, said device comprising means for supporting said engine in said body with an air passage between said body and said engine; a pipe connected with the outlet of said compressor; a hollow member connected with said pipe at the terminus thereof, said member being disposed within said passage and including a plurality of orifices therein, whereby compressed air flows from said compressor through said member and into said passage for inducing a flow of cooling air therethrough.

5. Cooling means for an aircraft having a jet propulsion engine and a body, wherein said engine is provided with a compressor and is disposed within said body to form an air passage between said engine and said body, said means comprising a conduit connected with the compressor of said engine and extending rearwardly therefrom; discharge means in said passage and disposed at the terminus of said conduit for receiving air therefrom, whereby air is conducted from said compressor and discharged rearwardly in said passage for inducing a flow of cooling air through said passage; and a valve for controlling the flow of air in said conduit.

JAMES D. HOFFMAN.

References Cited in the file of this patent

UNITED STATES PATENTS

| Number | Name | Date |
|---|---|---|
| 2,177,642 | Fellers | Oct. 31, 1939 |
| 2,404,954 | Godsey | July 30, 1946 |
| 2,517,524 | Beck | Aug. 1, 1950 |
| 2,539,089 | Lear | Jan. 23, 1951 |
| 2,586,299 | Burnelli | Feb. 19, 1952 |
| 2,591,676 | Clayton | Apr. 8, 1952 |
| 2,599,879 | Walker | June 10, 1952 |